United States Patent
Frye et al.

(10) Patent No.: US 6,421,998 B1
(45) Date of Patent: Jul. 23, 2002

(54) THRUSTER DEVICE RESPONSIVE TO SOLAR RADIATION

(75) Inventors: Patrick E. Frye, Simi Vally; Joseph P. Carroll, Moorpark; James M. Shoji, Calabasas, all of CA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/592,724

(22) Filed: Jun. 13, 2000

(51) Int. Cl.[7] .............................................. F03H 5/00
(52) U.S. Cl. ..................................................... 60/203.1
(58) Field of Search ........................ 60/203.1; 165/118; 415/72, 73

(56) References Cited

U.S. PATENT DOCUMENTS

| | | | |
|---|---|---|---|
| 700,531 A | * | 5/1902 | Miller ........................ 165/118 |
| 3,359,734 A | | 12/1967 | Ferrie et al. |
| 3,472,518 A | * | 10/1969 | Harlan ......................... 277/31 |
| 3,876,333 A | * | 4/1975 | Ronson ....................... 416/157 |
| 4,402,361 A | * | 9/1983 | Dominguez ................. 165/156 |
| 4,730,449 A | | 3/1988 | Cann |
| 4,825,647 A | | 5/1989 | Cann |
| 5,138,832 A | | 8/1992 | Pande |
| 5,459,996 A | | 10/1995 | Malloy, III et al. |

* cited by examiner

Primary Examiner—Louis J. Casaregola
(74) Attorney, Agent, or Firm—Alston & Bird LLP

(57) ABSTRACT

A thruster device and associated methods are provided. The thruster device comprises a frustoconical inner layer and a frustoconical outer layer that surrounds the inner layer such that the inner and outer layers cooperate to define a spiral flow passage therebetween. An outlet, such as a nozzle, is attached to an exit end of the thruster device such that the outlet is in fluid communication with the spiral flow passage. In one embodiment, the thruster device includes an end flow cap that is also attached to the exit end and establishes the fluid communication between the spiral flow passage and the outlet. The end flow cap includes at least one channel for directing the propellant from the spiral flow passage to the outlet. The design of the thruster device allows the frustoconical inner and outer layers to be assembled without galling or damaging the spiral flow passage.

12 Claims, 3 Drawing Sheets

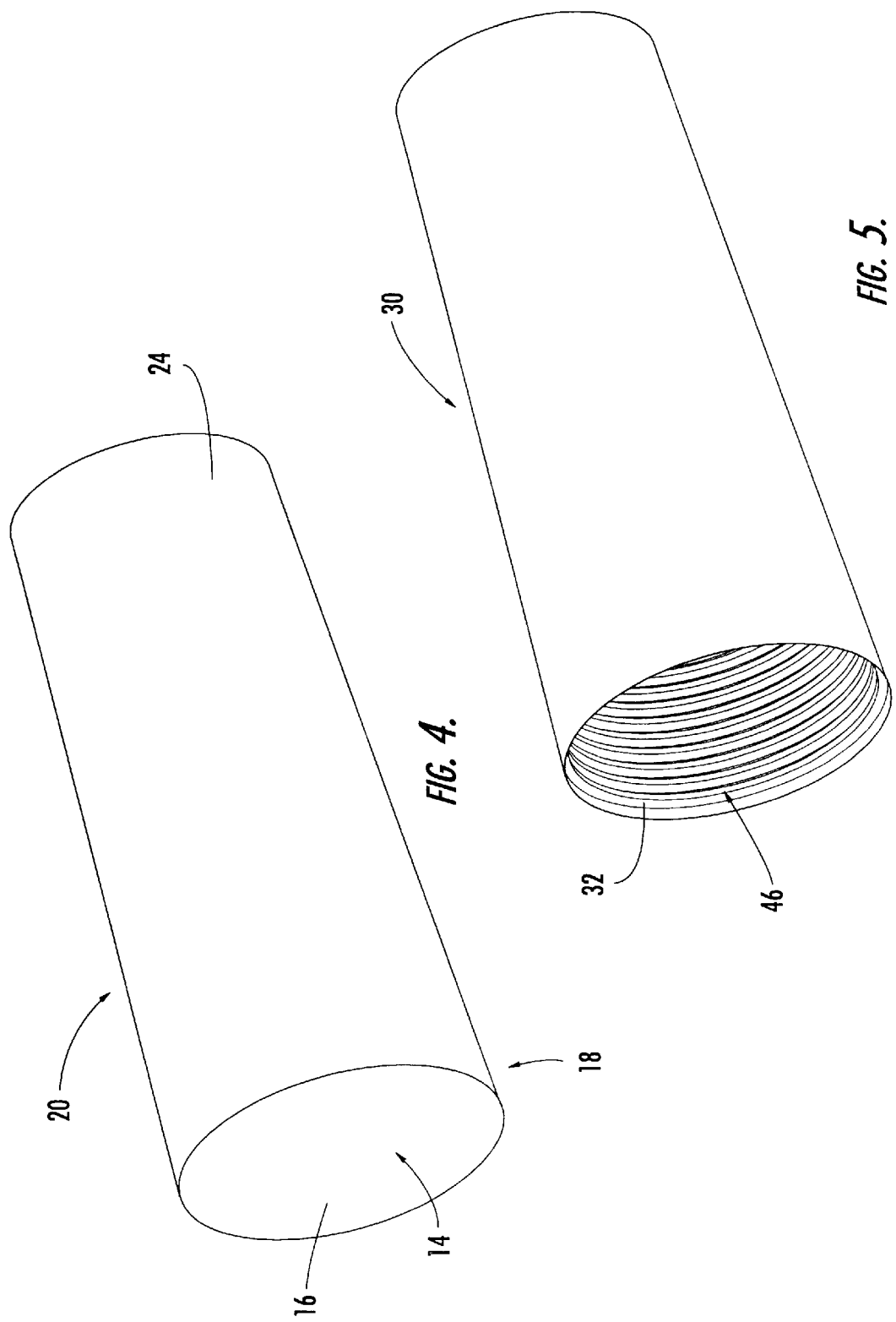

THRUSTER DEVICE RESPONSIVE TO SOLAR RADIATION

FIELD OF THE INVENTION

The present invention relates to solar energy systems, and in particular relates to solar power propulsion systems which use thermal energy for propelling and powering a spacecraft.

BACKGROUND OF THE INVENTION

Thruster devices are often used in the space industry, particularly for low power applications such as orbital positioning of a spacecraft. In particular, a thruster device, such as a solar thruster, may be used for correcting or maintaining the orbit of a satellite. Another application of thruster devices is to change or alter the orbital path of a satellite in order to avoid detection by other satellites or ground tracking devices.

Conventional solar thruster devices typically comprise a heat exchanger made of a material having a high coefficient of thermal conductivity, such as rhenium, tungsten, or halfnium carbide. The heat exchanger typically includes or defines a flow passage through which a working fluid or propellant is directed such that the solar energy incident upon the heat exchanger is transferred to the propellant. The high temperature propellant is then expelled from the thruster device by expansion through a nozzle, thereby producing thrust. The thrust is used by the satellite to maneuver between orbits or maintain a particular location.

The solar energy used by the thruster is gathered by the heat exchanger by means of a primary concentrator in conjunction with a secondary concentrator. The primary concentrator receives solar energy directly or by reflection and transfers this energy to the secondary concentrator which, in turn, directs the solar energy to the heat exchanger of the thruster device. The energy absorbed by the heat exchanger is then transferred to the propellant within the flow passage. The role of the flow passage is to provide a relatively long flow path along which the propellant can be heated and to direct the propellant to the nozzle. The most effective approach to achieving high thruster performance is to attain a high propellant temperature. The key to achieving this desirable high propellant temperature is dependent on the maximum allowable heat exchanger temperature as well as its thermoconductivity and other properties.

While the use of thruster devices is known, conventional thruster devices can be relatively difficult to manufacture. In particular, a conventional thruster design typically includes a flow passage formed by winding sections of three-foot metallic tubes around a cylindrical mandrel. The cylindrically wound tubes provide a large surface area for transferring solar energy to the propellant. The tubes are typically comprised of a refractory metal capable of withstanding high temperatures, such as rhenium. However, as the tubes are wound around the mandrel, the metal tubes work harden and are very difficult to form to the desired shape. In addition, the tube sections must be welded together prior to winding around the mandrel. Thus, this design requires a tedious, time-consuming and costly fabrication process.

Another conventional thruster device developed by Boeing comprises a cylindrical capsule-like body portion having a nozzle at one end. In contrast to winding a tube around a mandrel to form the flow passage, a series of spirally wound grooves are formed in an inner liner of the body portion, and an outer layer of the body portion is slid over the inner liner to form a spiral channel that directs propellant to the nozzle. This design, however, requires that the diametral clearance between the inner and outer liners be closely matched to avoid chafing between the liners upon assembly. In particular, chafing can damage the seal between the grooves forming the channel, which can have a deleterious effect on the flow of propellant and result in a loss of thrust.

In yet another design, a rhenium foam is positioned between two rhenium sheets to form a flow passage. However, this thruster design has not been proven experimentally.

Thus, there is a need for a thruster device that offers the same or improved performance relative to conventional thruster devices with reduced fabrication costs. In particular, it would be desirable to fabricate the thruster device without having to wind tubes around a mandrel to form the flow passage. There is also a need for providing a thruster device that can be easily assembled without damaging the flow passage.

SUMMARY OF THE INVENTION

These and other needs are provided, according to the present invention, by a thruster device having frustoconical inner and outer layers and a flow passage interposed between the two layers. The flow passage can be defined by the inner layer, outer layer, or both layers. As such, the thruster device of the present invention provides a flow passage formed without having to wind a tube around a mandrel, thereby simplifying the fabrication process. Advantageously, the frustoconical configuration of the inner and outer layers of the thruster device of the present invention allows for easy assembly of the thruster device with minimal risk of damaging the flow passage due to chafing between the inner and outer layers. Thus, the resulting thruster device can typically be fabricated relatively inexpensively.

In particular, the thruster device of the present invention advantageously comprises a frustoconical inner layer having inner and outer surfaces and opposed ends. A frustoconical outer layer surrounds the inner layer and means for defining a spiral flow passage are disposed between the inner and outer layers. Preferably, the inner and outer layers cooperate to define the spiral flow passage themselves. In one advantageous embodiment, the inner and outer layers are formed of at least one of rhenium and hafnium carbide in order to have good heat exchange properties. An outlet, such as a nozzle, is attached to one of the opposed ends of the inner and outer layers such that the outlet is in fluid communication with the spiral flow passage. In one embodiment, the thruster device also includes an end flow cap connected to the same end of the inner and outer layers for establishing fluid communication between the spiral flow passage and the outlet. The end flow cap includes at least one radial channel for directing the propellant from the spiral flow passage to the outlet.

A method of manufacturing a thruster device is also provided. In particular, the method comprises forming a spiral flow passage in at least one of the frustoconical inner and outer layers, and nesting the inner layer within the outer layer such that the spiral flow passage is defined between the inner and outer layers. The method also includes attaching an outlet, such as a nozzle, to at least one of the inner and outer layers such that the outlet is in fluid communication with the spiral flow passage. In one embodiment, the method also includes attaching an end flow cap between at least one of the inner and outer layers and the outlet for directing propellant to the outlet.

The spiral flow passage is formed by covering portions of one of the inner and outer layers with photoresist having a spiral pattern and then etching the uncovered portions. In one embodiment, the spiral flow passage can be formed by applying photoresist to one of the inner and outer layers and then exposing the photoresist to define a spiral configuration. The flow passage can then be finished by chemically etching the portions of the inner or outer layer from which the photoresist has been ablated. Thus, the flow passage can be formed to within precise tolerances.

Advantageously, the present invention provides a thruster device and associated methods that overcomes the shortcomings of conventional thrusters discussed above. In particular, the thruster device of the present invention provides a flow passage that is preferably defined by the inner and/or outer layers, instead of requiring a tube to be wound around a mandrel as in some conventional thruster devices. Furthermore, the thruster device of the present invention is easy to assemble, since the frustoconical configuration of the inner and outer layers do not abrade against one another as the outer layer is positioned over the inner layer. As such, the thruster device of the present invention is improved in both cost and performance. In particular, the design of the thruster device significantly simplifies the fabrication process compared to conventional thrusters by reducing the number of parts required to form the flow passage and eliminating the costly and time consuming process of welding and winding tubes about a mandrel to form the flow passage. In addition, the design of the thruster device reduces the likelihood of damaging the flow passage during assembly by reducing, if not eliminating, abrading and other deleterious contact between the inner and outer layers as the inner layer is inserted into the outer layer. Thus, the thruster device of the present invention has reduced fabrication costs. As a result, the propellant can be directed to the outlet in a more efficient manner, which results in higher performance of the thruster device. Advantageously, the improved performance of the thruster device allows for greater payload capacity along with lower costs per firing cycle.

BRIEF DESCRIPTION OF THE DRAWINGS

Some of the objects and advantages of the present invention having been stated, others will appear as the description proceeds when taken in conjunction with the accompanying drawings, which are not necessarily drawn to scale, wherein:

FIG. 4 is a perspective view of an inner layer of the thruster device according to an alternative embodiment of the present invention; and FIG. 5 is a perspective view of an outer layer of the thruster device according to an alternative embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
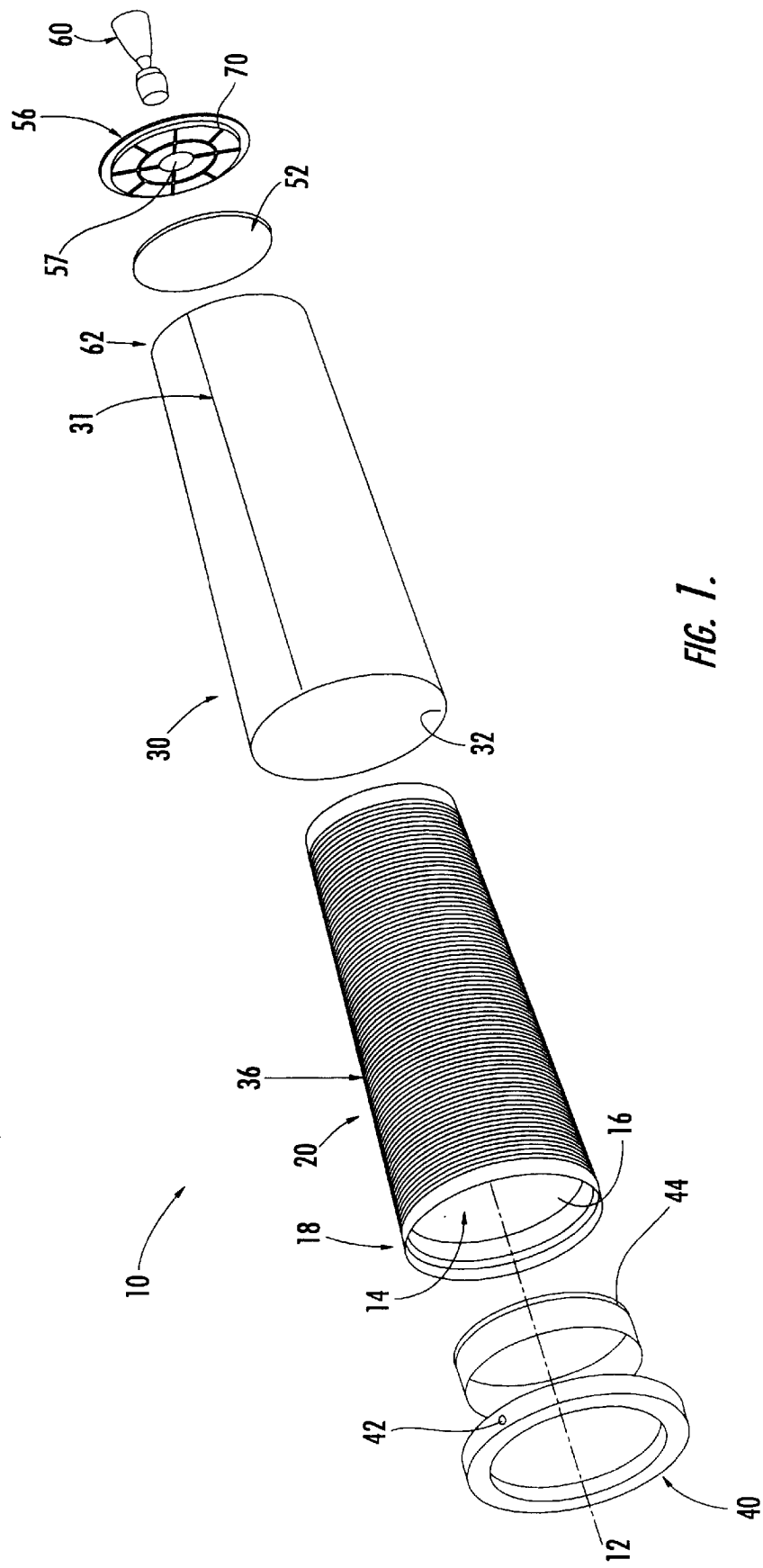
FIG. 1 is an exploded perspective view of a thruster device according to one embodiment of the present invention.
Figure 3:
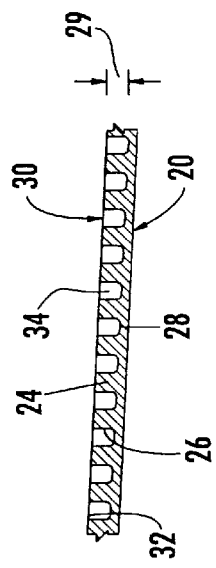
FIG. 3 is a highly magnified cross-sectional view of a portion of the thruster device of FIG. 2.
Figure 2:
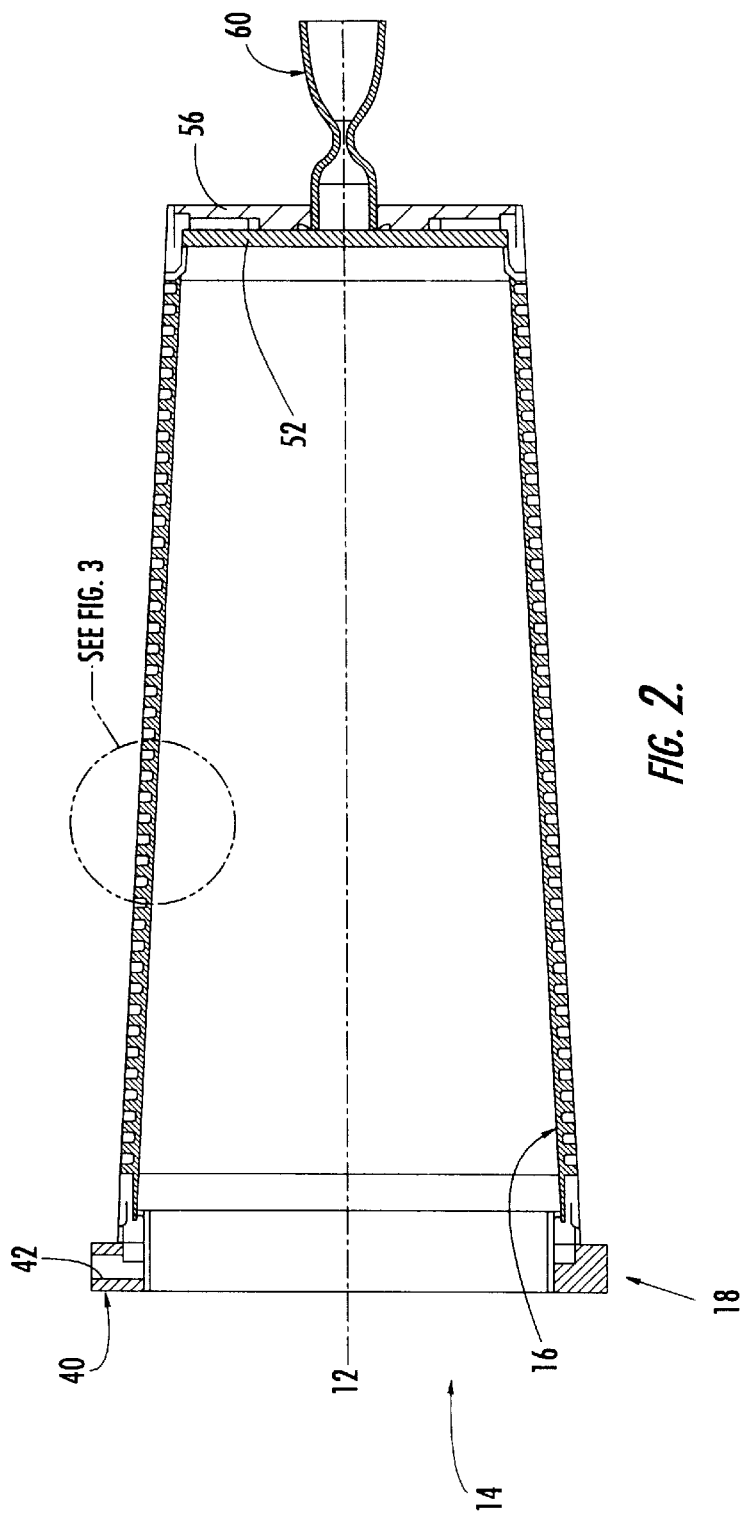
FIG. 2 is a cross-sectional view of the thruster device of FIG. 1.

Turning first to FIGS. 1–3, a thruster device 10 is provided for positioning objects in space, such as satellites. The thruster device utilizes solar energy to heat propellant, such as gaseous hydrogen, and direct the propellant through an outlet, such as nozzle. The expansion of the propellant through the outlet produces thrust, which is used by the satellite or other space-positioned object to maneuver between orbits or to maintain a particular location in space. However, the fabrication process described hereinbelow can be applied to other devices, such as any high temperature heat exchanger, high-temperature ruster, or other component requiring the heating of a fluid, typically to above about 3500° F.

In particular, the thruster device 10 comprises an inner layer 20 having an inner surface 16 and an outer surface 24. In one embodiment, the inner layer 20 comprises a refractory metal, such as rhenium, which is capable of withstanding the high temperatures associated with the operation of the thruster device 10. Other materials may also be used, such as tantalum carbide or zirconium carbide. More specifically, the thruster device 10 has an operating temperature of between 3500° F.–5900° F., which precludes the use of most metals except for rhenium and other metals having similar characteristics, such as tungsten and hafnium carbide. Advantageously, the use of these metals allows for a thinner wall thickness compared to using other metals, which allows for a higher operating temperature, such as about 5600° F. or higher. For example, by forming the inner layer from hafnium carbide, the maximum operating temperature can be increased to about 5800° F., which results in a thruster performance gain of about 15% over using other metals. The inner layer 20 defines a central opening 14 about a central axis 12. The central opening 14 allows solar energy to be directed into an entry end 18 of the device 10 and focused onto the inner surface 16 of the inner layer 20 by a concentrating mirror (not shown). Solar energy impinging on the inner surface 16 of the inner layer 20 is absorbed by the inner layer and subsequently raises the temperature of the propellant, as discussed more fully below.

The thruster device 10 also comprises an outer layer 30 surrounding the inner layer 20. In one embodiment, the outer layer 30 is formed from the same material as the inner layer 20, although the inner and outer layers can be formed from different materials. In one embodiment, the thruster device 10 has a length of about eight inches along the central axis 12 and has a diameter of about 3 inches at the entry end 18 and a diameter of about 2 inches at the exit end 62. The thruster device, however, can have other sizes.

As shown in FIGS. 1 and 2, the thruster device 10 includes an outlet 60 at the exit end 62 of the thruster device. In one embodiment, the outlet 60, such as a nozzle, is made from a refractory metal, although the outlet may comprise other materials. The thruster device 10 also includes an end flow cap 56 connected between the exit end of the inner and outer layers and the outlet 60, typically by means of electron beam welding (designated EBW in FIG. 2). The end flow cap 56 defines an opening 57 for receiving the outlet 60 and at least one radial passage for establishing fluid communication between the spiral flow passage and the outlet. The thruster device can also include an end cap 52. The end cap is a solid disc for closing the exit end of the thruster device and is accordingly connected, such as by EBW, to the exit end of the inner and outer layers, the end flow cap and/or the outlet. The end flow cap 56 and end cap 52 can be machined from a refractory metal, although other materials and processes to make the end flow cap and end cap can be used. Preferably, the end flow cap 56 and the end cap 52 comprise the same material. In one embodiment, the end flow cap 56 defines radially extending channels 70 extending from the opening 57 for directing propellant from the flow passage 34 to the outlet 60. Although channels 70 shown in FIG. 1 have a radial configuration, other configurations may also be used, such as a spiral configuration. Orientation of the outlet 60 can vary as well, and is shown in FIG. 2 at 0° relative to the central axis 12. In addition, the outlet 60 is interchangeable with outlets having different outlet sizes and geometries. To replace the outlet 60, the electron beam weld or other seal must first be broken or removed around the exit end 62 where the end flow cap 56 and end cap 52 are secured, and the outlet then replaced with an outlet of the desired size and shape.

The thruster device includes means for defining a flow passage, preferably a spiral flow passage, between the inner and outer layers. In one advantageous embodiment, the means for defining the flow passage is provided by the outer surface 24 of the inner layer 20 and the inner surface 16 of the outer layer 30 which cooperate to define a flow passage 34. Although the flow passage 34 is described in singular form, the flow passage may include a plurality of intertwined flow passages, as described hereinbelow. The flow passage 34 is in fluid communication with the outlet 60 such that propellant can be directed through the outlet and expelled from the thruster device 10. In one embodiment, the flow passage 34 is primarily defined by a spiral channel 36 formed into the outer surface 24 of the inner layer 20, as discussed more fully below. The spiral channel 36 is defined by sidewalls 26 and a base portion 28, and may have one of many shapes, such as a generally rectangular shape. Once the thruster device has been assembled, the inner surface 32 of the outer layer 30 closes the open top of the spiral channel defined by the outer surface of the inner layer to completely define the flow passage. The flow passage 34 extends along substantially the entire length of the thruster device 10, which in one embodiment is about eight inches. According to the present invention, fabrication and assembly costs of the thruster device including the aforedescribed flow passage 34 are much less than the conventional thruster devices discussed above which employ spirally-wound tubing as the flow passage.

FIGS. 4 and 5 show alternative embodiments of the inner layer 20 and outer layer 30 that cooperate to define the flow passage 34 (See FIG. 2) according to the present invention. In one alternative embodiment, the flow passage 34 is partially defined by a spiral channel 46 formed in the inner surface 32 of the outer layer 30, as discussed more fully below. In this embodiment, the inner layer 20 has a smooth outer surface 24 that cooperates with the inner surface 32 of the outer layer 30 to define the flow passage 34. In another alternative embodiment, the flow passage 34 may be defined by spiral channels formed in both the inner layer 20 and the outer layer 30 such that the channels cooperatively mate to form the flow passage 34. In this alternative embodiment, the channel 46 defined by the outer layer of FIG. 5 cooperates with the channel 36 defined by the inner layer of FIG. 1 to form the flow passage 34.

Advantageously, the inner and outer layers 20, 30 are coaxial and have a cooperating frustoconical configuration. In this regard, the inner and outer layers can be easily assembled without chafing or galling the inner surface of the outer layer and/or the outer surface of the inner layer, which can often occur during assembly of conventional thruster devices having cylindrical inner and outer layers because of the cylindrical configuration and the small diametral clearance required between the inner and outer layers to form the flow passage.

Typically, the inner and outer layers cooperate to define a plurality of intertwined spiral flow passages. As such, the thruster device 10 can also include an inlet manifold 40 and spacer ring 44 that are coaxial to the inner and outer layers 20, 30 and secured to the entry end 18 by electron beam welding or the like. The inlet manifold 40 is in fluid communication with each flow passage 34 and defines a flow inlet 42 for receiving propellant into the inlet manifold. In this regard, the inlet manifold 40 receives propellant through the flow inlet 42 and directs the propellant into each spiral flow passage 34 defined by the inner and outer layers 20, 30. In this embodiment, the end flow cap can also define a plurality of radial passages for establishing fluid communication between respective spiral flow passages and the outlet.

In operation, the propellant is directed through the flow passage 34, where the majority of heat transfer of solar radiation to the propellant takes place. In this regard, solar energy enters the central opening 14 at the entry end 18 of the thruster device 10, where it is absorbed through the inner surface 16 of the inner layer 20. As the solar energy travels further into central opening 14, the inner surface 16 of the inner layer 20 increases in temperature in the direction of propellant flow due to the energy-concentrating frustoconical design of the device 10 and the increasing temperature of the propellant inside the flow passage 34. As a result, the regenerative cooling effect on the solar energy in the central opening 14 is decreased because the temperature differential between the propellant and the inner surface 16 of the inner layer 20 decreases towards the exit end 62 of the thruster device 10. Accordingly, the greatest temperatures of the inner layer 20, outer layer 30, and the propellant are achieved closest to the exit end 62, which significantly reduces re-radiation losses and improves efficiency compared to conventional designs.

A method of manufacturing the thruster device 10 according to the present invention is also provided. In particular, the method comprises forming the spiral flow passage 34 in at least one of the frustoconical inner and outer layers 20, 30, nesting the inner and outer layers to define the spiral flow passage 34, and attaching the outlet 60 such that the outlet is in fluid communication with the flow passage. In one embodiment, the flow passage 34 is defined by the inner surface 32 of the outer layer 30 and a spiral channel 36 formed into the outer surface 24 of the inner layer 20. More specifically, the spiral channel is formed in the inner layer 20 by first applying photoresist to the outer surface 24 thereof. The inner layer 20 is then placed on a surface, such as a rotatable, conical mandrel, and an ultraviolet lamp (not shown) is directed to the outer surface 24 having the photoresist applied thereon. The ultraviolet lamp is moved along the central axis 12 while the inner layer 20 is rotated about the central axis 12 such that the photoresist is exposed to the ultraviolet lamp in a spiral pattern. The pattern of exposure represents the pattern of the spiral channel 36 that will be subsequently formed in the inner layer.

The inner layer 20 having the patterned photoresist on the outer surface 24 thereof is then subjected to an etching process, such as a chemical etching process. In one embodiment, the inner layer 20 as just described is placed in a chemical etchant bath for a predetermined time wherein the chemical etchant reacts with the exposed outer surface 24 of the inner layer 20, i.e., where the photoresist has been exposed to the ultraviolet lamp. The amount of time the inner layer 20 is exposed to the chemical etchant determines the depth 29 of the spiral channel 36 measured in a radial direction. In one embodiment, in which the inner layer has a thickness of 0.035 inches, the depth 29 is about 0.09 inches. Following etching, the remainder of the photoresist is stripped or otherwise removed from the inner layer 20 and then positioned or nested within the outer layer 30 such that the inner surface 32 of the outer layer cooperates with the outer surface 24 of the inner layer to define the flow passage 34. Advantageously, the frustoconical configuration of the inner and outer layers 20, 30 allow the layers to be assembled without chafing, abrading, or galling, which can be deleterious to the flow passage 34 by preventing a suitable seal from being formed between the spiral channel 36 and the inner surface 32 of the outer layer 30.

In another embodiment, the outer layer 30 defines the spiral channel 46 formed generally according to the process described above. In particular, the outer layer 30 is formed from a sheet of a refractory metal, such as rhenium, having a thickness around 0.010–0.030 inches, and preferably around 0.015 inches. The outer layer 30 can also be formed by other processes, such as by machining the outer layer from a block. However, forming the outer layer 30 from a sheet is preferable for manufacturing and cost purposes. The inner surface of the outer layer is typically coated with photoresist, exposed to the ultraviolet lamp as described above and etched while the outer layer is in a sheet configuration. Once the spiral channel 36 has been formed in the inner surface 32 of the outer layer 30, the outer layer 30 is placed on a conical mandrel and shaped into a frustoconical configuration. The outer layer 30 is secured in the frustoconical configuration by electron beam butt welding or the like along a seam 31 defined by the edges of the sheet forming the outer layer. The inner and outer layers 20, 30 are then positioned such that inner surface 32 of the outer layer 30 and the outer surface 24 of the inner layer 20 cooperate to define the flow passage 34. In one embodiment, the inner and outer layers 20, 30 are secured together by sintering.

In yet another embodiment, the inner layer 20 and outer layer 30 each define spiral channels 36, 46 formed therein by the processes described above, and the inner and outer surfaces 32, 24 of the inner and outer layers cooperate to define the spiral flow passage 34.

Thus, the present invention provides a thruster device 10 and associated methods that overcomes the shortcomings of conventional thrusters mentioned above. In particular, the thruster device 10 of the present invention provides a flow passage 34 that is preferably defined by the inner and/or outer layers 20, 30, instead of requiring a tube to be wound around a mandrel as in conventional thruster devices. Furthermore, the inner and outer layers 20, 30 of the thruster device 10 are easy to assemble, since the frustoconical configuration of the inner and outer layers allows the layers to nest without abrading against one another as the outer layer is positioned over the inner layer, which can have deleterious effects on the flow passage 34. As such, the thruster device 10 of the present invention is improved in both cost and performance. In particular, the design of the thruster device significantly simplifies the fabrication process compared to conventional thrusters by eliminating the costly and time consuming process of winding tubes about a mandrel to form the flow passage. In addition, the design of the thruster device 10 reduces the likelihood of damaging the flow passage 34 during assembly by reducing, if not eliminating, abrading and other deleterious contact between the inner and outer layers 20, 30 as the inner layer is inserted into the outer layer. Thus, the thruster device 10 has reduced fabrication costs. As a result, propellant can be directed to the outlet 60 in a more efficient manner, which results in more thrust and higher performance of the thruster device 10. Advantageously, the improved performance of the thruster device allows for greater payload capacity along with lower costs per firing cycle, particularly for missions to geosynchronous equatorial orbit.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A thruster device responsive to solar radiation to heat a properllant, comprising:

a frustoconical inner layer having inner and outer surfaces and opposed ends;

a frustoconical outer layer surrounding said inner layer, said outer layer having inner and outer surfaces and opposed ends such that the outer surface of said inner layer and the inner surface of said outer layer cooperate to define a spiral flow passage, at least one of the inner and outer layers being operable to absorb solar radiation and transfer at least a portion of the solar radiation to the propellant; and a thrust-producing outlet attached to one of said opposed ends of said inner and outer layers and in fluid communication with said spiral flow passage, said spiral flow passage operable to receive and direct the propellant therethrough to said outlet in order to produce thrust.

2. A thruster device according to claim 1, wherein the outer surface of said inner layer defines a spiral groove that at least partially defines said spiral flow passage.

3. A thruster device according to claim 1, wherein the inner surface of said outer layer defines a spiral groove that at least partially defines said flow passage.

4. A thruster device according to claim 1, wherein said inner and outer layers are comprised of at least one of rhenium, hafnium carbide, tantalum carbide, and zirconium carbide.

5. A thruster device according to claim 1, further comprising an end flow cap defining at least one radial channel that is in fluid communication with both the flow passage and said outlet for directing propellant to said outlet.

6. A thruster device according to claim 1, wherein said outlet is a nozzle.

7. A thruster device responsive to solar radiation to heat a propellant, comprising:

a frustoconical inner layer having inner and outer surfaces and opposed ends;

a frustoconical outer layer surrounding said inner layer, said outer layer having inner and outer surfaces and opposed ends, at least one of the inner and outer layers being operable to absorb solar radiation and transfer at least a portion of the solar radiation to the propellant;

means for defining a spiral flow passage disposed between said inner and outer layers; and a thrust-producing outlet attached to one end of said opposed ends of said inner and outer layers and in fluid communication with the spiral flow passage for directing propellant theretrough to said outlet in order to produce thrust.

8. A thruster device according to claim 7, wherein the outer surface of said inner layer at least partially comprises the means for defining the spiral flow passage.

9. A thruster device according to claim 7, wherein the inner surface of said outer layer at least partially comprises the means for defining the spiral flow passage.

10. A thruster device according to claim 7, wherein said inner and outer layers are comprised of at least one of rhenium and hafnium carbide.

11. A thruster device according to claim 7, further comprising an end flow cap defining at least one radial channel that is in fluid communication with both the spiral flow passage and said outlet for directing propellant to said outlet.

12. A thruster device according to claim 7, wherein said outlet is a nozzle.

* * * * *